(12) United States Patent
Haque et al.

(10) Patent No.: US 12,069,183 B2
(45) Date of Patent: Aug. 20, 2024

(54) SYSTEMS, METHODS, AND APPARATUSES FOR NETWORK MANAGEMENT

(71) Applicant: Comcast Cable Communications, LLC, Philadelphia, PA (US)

(72) Inventors: Asad Haque, Philadelphia, PA (US); Bahar Limaye, Leesburg, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 58 days.

(21) Appl. No.: 17/335,871

(22) Filed: Jun. 1, 2021

(65) Prior Publication Data

US 2021/0377047 A1    Dec. 2, 2021

Related U.S. Application Data

(60) Provisional application No. 63/031,864, filed on May 29, 2020.

(51) Int. Cl.
| | | |
|---|---|---|
| *H04L 9/32* | (2006.01) | |
| *H04L 9/08* | (2006.01) | |
| *H04L 12/24* | (2006.01) | |
| *H04L 41/08* | (2022.01) | |

(52) U.S. Cl.
CPC .......... *H04L 9/3247* (2013.01); *H04L 9/0825* (2013.01); *H04L 9/3213* (2013.01); *H04L 9/3263* (2013.01); *H04L 41/0879* (2013.01)

(58) Field of Classification Search
CPC ... H04L 9/3268; H04L 9/0825; H04L 9/3263; H04L 9/3213; H04L 63/0807; H04L 63/0823; H04L 63/0442; H04L 9/3247; H04L 41/0879; H04L 63/126
See application file for complete search history.

(56) References Cited

U.S. PATENT DOCUMENTS

| | | | |
|---|---|---|---|
| 10,356,092 B2* | 7/2019 | Mattela | H04L 63/083 |
| 11,138,608 B2* | 10/2021 | Green | H04L 9/0643 |
| 2016/0198285 A1* | 7/2016 | Lin | H04W 4/38 |
| | | | 709/209 |
| 2017/0359343 A1* | 12/2017 | Sterl | H04L 63/0876 |
| 2018/0054490 A1* | 2/2018 | Wadhwa | G08G 1/0129 |
| 2018/0084424 A1* | 3/2018 | Sonasath | G06Q 10/02 |
| 2018/0183587 A1* | 6/2018 | Won | H04W 4/70 |
| 2018/0189514 A1* | 7/2018 | Yocam | H04W 4/44 |
| 2019/0114061 A1* | 4/2019 | Daniels | G06F 15/16 |
| 2019/0327591 A1* | 10/2019 | Karimli | H04L 9/3213 |
| 2020/0169886 A1* | 5/2020 | Bhatt | H04W 12/08 |
| 2020/0260276 A1* | 8/2020 | Syed | H04L 67/51 |
| 2021/0312440 A1* | 10/2021 | Badal-Badalian | |
| | | | G06Q 20/3278 |

* cited by examiner

*Primary Examiner* — Mohammad A Siddiqi
(74) *Attorney, Agent, or Firm* — Ballard Spahr LLP

(57) ABSTRACT

Methods, systems, and apparatuses for network management are described. A network device may provide a network that is accessible using a network credential. An internet of things (IoT) device may be required to be configured or provisioned before joining the network. The IoT device may be associated with a scannable identifier. A user device may determine the scannable identifier and, based on the scannable identifier, provide provisioning credentials to the IoT device.

20 Claims, 10 Drawing Sheets

SYSTEMS, METHODS, AND APPARATUSES FOR NETWORK MANAGEMENT

CROSS REFERENCE TO RELATED APPLICATION

This application claims priority to U.S. Provisional Application No. 63/031,864, filed May 29, 2020, the entirety of which is incorporated herein by reference.

BACKGROUND

Wireless networks offer users greater flexibility and connectivity than traditional wired networks. As more devices become Internet-capable, wireless networks have grown in size and complexity. When a device which is new to a wireless network requires credentials, users associated with devices that were previously associated with the wireless network must configure the device with network credentials in order join the wireless network. This can be burdensome for some users and devices. The burden is even greater when a device that requires the new network credentials does not have a user interface (e.g., smart devices, Internet-capable appliances, Internet-capable sensors, etc.). Further, existing authentication and configuration methods are less secure than newer methods; however, many Internet-capable devices in use today employ these legacy authentication and configuration methods.

SUMMARY

It is to be understood that both the following general description and the following detailed description are exemplary and explanatory only and are not restrictive, as claimed. Methods, systems, and apparatuses for network management are described herein. A network device may generate (e.g., broadcast) a wireless network, such as a WiFi network. In order to access the wireless network, IoT devices may be required to provide network credentials for the network to the network device. An IoT device may be, for example, a computing device, a smart device, an Internet-capable appliance, an Internet-capable sensor, combinations thereof, and the like. The network credentials may include, for example, a network name and a network password. The IoT device may be identified by scanning an identifier such as a quick response (QR) code. The network credentials may be provided to the IoT device during a configuration session. The IoT device may be provided a configuration message.

The configuration message may include a hash of a configuration identifier. The configuration identifier may have been generated by the network device for the IoT device. The network device may generate the configuration message. The network device may send the configuration message to the IoT device as part of a configuration session (e.g., via a secure communication channel). The network credentials may be provided to the IoT device as part of a secure message. The IoT device may receive the secure message and determine the network credentials.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
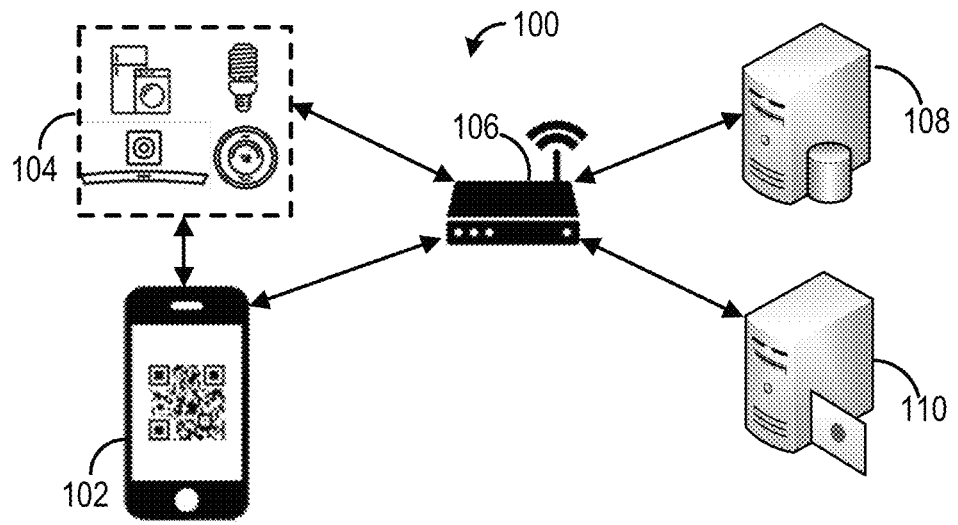
FIGS. 1A and 1B show an example system.

Before the present methods and systems are described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Described are components that can be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in described methods. Thus, if there are a variety of additional steps that can be performed it is understood that each of these additional steps can be performed with any specific embodiment or combination of embodiments of the described methods.

The present methods and systems may be understood more readily by reference to the following detailed description and the examples included therein and to the Figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods, systems, and apparatuses for network management are described herein. A network device may generate (e.g., broadcast) a network. The network device may be an access point, a router, a gateway device, combinations thereof, and the like. In order to access the network, one or more IoT devices may be required to provide network credentials for the network to the network device. The network credentials may include, for example, a network name (e.g., a Service Set Identifier or "SSID") and a network password. The one or more IoT devices may include computing devices, smart devices, set-top boxes, Internet-capable devices, combinations thereof, and the like.

An IoT device of the one or more IoT devices may be configured to communicate with the network device during a configuration session. The network device may generate a configuration identifier associated with the network device and the IoT device during the configuration session. The IoT device and the network device may use Device Provisioning Protocol ("DPP"), which is a secure provisioning protocol provided by the Wi-Fi Alliance™. For example, the configuration session may be a DPP configuration session.

A user device in communication with the network device may cause the network device to initiate the configuration session with the IoT device. The user device may initiate the configuration session on behalf of the IoT device. For example, the user device may be configured to communicate with the network device, while the IoT device may not be configured to communicate with the network device. The user device may assist the IoT device in being configured to communicate with the network device. The user device may determine configuration data from the IoT device. The configuration data may include a quick response (QR) code, a universal product code (UPC), Uniform Resource Identifier (URI), or the like. The configuration data may represent a public key, a configuration channel, and/or a Media Access Control ("MAC") address associated with the IoT device. The configuration data may be decoded by the user device from an image or other representation of the configuration data captured by the user device. As another example, the user device may receive the configuration data from the IoT device via a message sent by the IoT device using a wireless interface. For example, the IoT device may receive the configuration data via a short range communication technique such as Bluetooth, Bluetooth Low Energy (BLE), or the like.

The user device may provide the configuration data to the network device as a configuration payload. The user device may direct the network device to initiate the configuration session with the IoT device. The network device may receive the configuration payload from the user device. As another example, the network device may receive the configuration payload from the IoT device in response to a software and/or firmware provisioning performed by the IoT device. The network device may generate the configuration identifier in response to receiving the configuration payload from the IoT device (e.g., following the software and/or firmware update performed by the IoT device).

The network device may generate the configuration identifier. The configuration identifier may be associated with the network device and the IoT device. For example, the network device may generate a separate configuration identifier for each IoT device that the network device configures. The network device may initiate the configuration session with the IoT device. The network device may provide the configuration identifier and the configuration data (e.g., the public key) to the IoT device during the configuration session. For example, the network device may generate a configuration package (e.g., one or more packets of data) that includes the configuration identifier and the configuration data. The configuration package may identify the IoT device via the MAC address identified by the URI. The network device may send the configuration package to the IoT device via the configuration channel identified by the URI during the configuration session.

The network device and/or the IoT device may use the configuration identifier to determine whether one or more communications received by the network device and/or the IoT device are legitimate (e.g., originated from a trustworthy source). The network device may provide the network credentials to the IoT device during the configuration session. For example, the configuration package may include the network credentials. As another example, the network device may send the network credentials to the IoT device separate from the configuration package (e.g., a separate packet(s) of data) as a secure message. The IoT device may use the network credentials to join the network generated by the network device. In an embodiment, the IoT device may be preconfigured with credentials for accessing a second network. The second network may comprise a public or private network separate from a home network.

FIG. 1A, shows an example system 100. The system 100 may include a user device 102, an internet-of-things (IoT) device 104, a network device 106, and a computing device 108 and a certificate authority 110. The certificate authority 110 may comprise a server. For example, the certificate authority may comprise a trusted certificate authority such as a Public Key Infrastructure (PKI) server. The network device 106 may provide wired and/or wireless network infrastructure for the system 100. The network device 106 may be an access point, a router, a gateway device, combinations thereof, and the like. The user device 102 may be a mobile device, a tablet, a laptop, a desktop, and/or the like. The user device 102 may have been previously configured to communicate with the network device 106 using a device provisioning protocol ("DPP"). The DPP may be a secure provisioning protocol provided by the Wi-Fi Alliance™, or a legacy provisioning technique. For example, the user device 102 may have been previously configured to communicate with the network device 106 via a network generated (e.g., broadcast) by the network device 106. The network may operate on one or more 802.11 protocols (e.g., WiFi). The user device 102 may assist in configuring one or more "headless" IoT devices to communicate with the network device 106. A headless device may refer to an IoT device which does have a monitor, graphical user interface, or other peripheral devices. For example, the IoT device 104 may be a headless device of the one or more headless IoT devices that lacks a graphical user interface. In another embodiment, the user device 102 may not assist in configuring the headless IoT devices to communicate with the network as the headless IoT devices may comprise preconfigured IoT devices. The IoT device 104 may be a computing device, a smart device, a set-top box, an Internet-capable device, a sensor, a light bulb, a camera, an actuator, an appliance, a game controller, audio equipment, one or more thereof, and/or the like. As a "headless" IoT device 104 may not have an interface for entering network credentials, the user device 102 may communicate with the network device 106 on behalf of the IoT device 104 in order to provision the IoT device 104 for communicating with the network device 106. The network device 106 may communicate with any of the other devices of system 100. For instance, the network device 106 may send the configuration payload to the computing device 108. For example, the network device 106 may send one or more of a key pair, a public key, a private key, a certificate signing request (CSR), and/or a token (e.g., an authentication token), or any combination thereof to the computing device 108. The computing device 108 may comprise a communications module 121, a configuration module 123, or an access control module 125 as described below.

As another example, the IoT device 104 may not be a "headless" device. That is, the IoT device 104 may be computing device comprising a screen/display, or other interface such as a mobile device or any other Internet-capable device having a screen/display (e.g., for a graphical user interface). The user device 102 may assist the IoT device 104 in being configured to communicate with the network device 106. The user device 102 may communicate with the network device 106 on behalf of the IoT device 104 in order to provision the IoT device 104 for communicating with the network device 106.

Figure 1B:
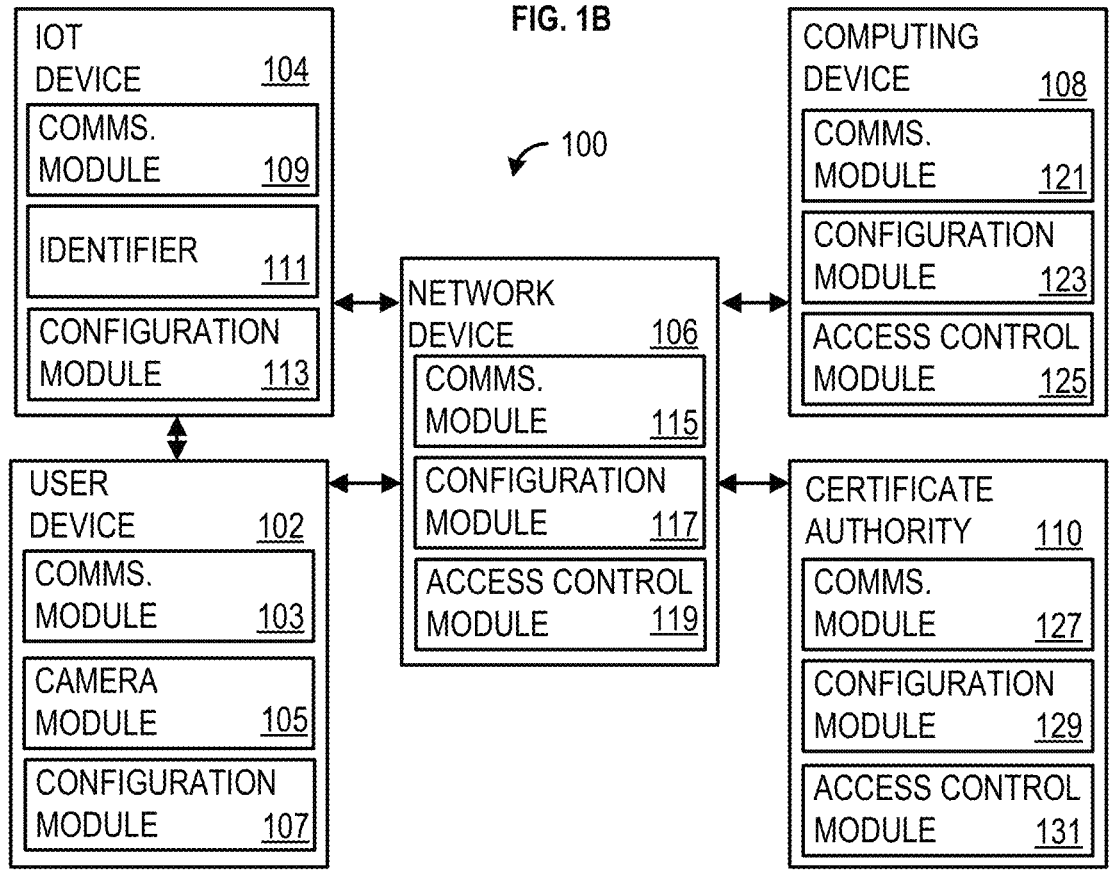

FIG. 1B shows a block diagram illustrating the example system 100. The user device 102 may have a communications module 103, a camera module 105, and a configuration module 107. The communications module 103 may be used to send and/or receive communications to/from other devices of the system 100. The communications module 103 may include one or more wireless interfaces, such as an 802.11 radio, a ZigBee radio, a Z-Wave radio, or a Bluetooth™ radio. The camera module 105 may be used to capture images, such as an image located on an IoT device, on documentation associated with the IoT device (e.g., a user manual), on packaging associated with the IoT device (e.g., a box), one or more thereof, and/or the like. For example, the camera module 105 may be configured to capture and process image data related to quick response (QR) codes, universal product codes (UPCs), and the like and combinations thereof. The configuration module 107 may include software the user device 102 may use when assisting in configuration of the headless IoT device to communicate with the network device 106. For example, the configuration module 107 may include DPP software and/or legacy provisioning software. Likewise, the configuration module 107 may be configured to process the image captured by the camera module 105.

The IoT device 104 may have a communications module 109, an identifier 111, and a configuration module 113. The communications module 109 may be used to send and/or receive network communications, such as wireless network communications sent to and/or received from the user device 102 and/or the network device 106. The communications module 109 may include one or more wireless interfaces, such as an 802.11 radio, a ZigBee radio, a Z-Wave radio, or a Bluetooth™ radio. Each of the one or more wireless interfaces may have an assigned MAC address. The identifier 111 may be representative of configuration data, such as a Uniform Resource Identifier ("URI"). The URI may represent a public key, a configuration channel, and/or a Media Access Control ("MAC") address associated with the IoT device 104. The identifier 111 may be an image located on the IoT device 104, on documentation associated with the IoT device 104 (e.g., a user manual), on packaging associated with the IoT device 104 (e.g., a box), combinations thereof, and the like. For example, the image may be of a barcode, a Quick Response ("QR") code, a string of text/numbers, one or more thereof, and/or the like. The IoT device 104 may provide the identifier 111 to one or both of the user device 102 or the network device 106 via WiFi using the communications module 109. As another example, the IoT device 104 may provide the identifier 111 to one or both of the user device 102 or the network device 106 via a Bluetooth™ message, a ZigBee message, a Z-Wave message, an NFC message, etc., generated and sent by the communications module 109.

The configuration module 113 may include software the IoT device 104 may use during a configuration session with one or both of the user device 102 or the network device 106. For example, the configuration module 113 may include DPP software and/or legacy provisioning software. The IoT device 104 may use the configuration module 113 to decipher and/or validate messages received from the network device 102 as part of a configuration and/or reconfiguration session, such as a hash of a configuration identifier. The IoT device 104 may use the configuration module 113 to generate a private key in response to receiving the configuration identifier. The IoT device 104 may use the configuration module 113 to generate a private key associated with the URI. The private key may be used by the IoT device 104 to decipher messages received from the network device 106 that are secured (e.g., wrapped) using AES-SIV, SHA-256, a combination thereof, and/or the like.

The network device 106 may have a communications module 115, a configuration module 117, and an access control module 119. The communications module 115 may be configured to send and/or receive communications to/from other devices of the system 100. The communications module 115 may include one or more wireless interfaces, such as an 802.11 radio, a ZigBee radio, a Z-Wave radio, or a Bluetooth™ radio. The communications module 115 may be configured to send and/or receive network communications, such as broadcasting a wireless network and sending/receiving data to/from IoT devices associated with the network. The configuration module 117 may include software the network device 106 may use when configuring the headless IoT device to communicate with the network device 106. For example, the configuration module 117 may include DPP software and/or legacy provisioning software. The network device 106 may use the configuration module 117 when generating a configuration identifier for the IoT device during a configuration session. The configuration identifier may be a public key associated with the network device 106. The DPP C-sign-key may be part of a key pair. While the DPP C-sign-key may be a public key provided to the IoT device 104, the DPP c-sign-key is a private key used by the network device 106 to sign (e.g., verify authenticity) communications sent to IoT devices. The access control module 119 may be a secure repository of the network device 106 used to store a client routing table(s), a configuration identifier for each configured IoT device, a Media Access Control ("MAC") address(es) for each configured IoT device, network credentials, combinations thereof, and the like.

The computing device 108 may have a communications module 121, a configuration module 123, and an access control module 125. The communications module 121 may be configured to send and/or receive communications to/from other devices of the system 100. The communications module 121 may include one or more wireless interfaces, such as an 802.11 radio, a ZigBee radio, a Z-Wave radio, or a Bluetooth™ radio. The communications module 121 may be configured to send and/or receive network communications, such as broadcasting a wireless network and sending/receiving data to/from IoT devices associated with the network. The configuration module 123 may include software the computing device 108 may use when configuring the headless IoT device to communicate with the network device 106. For example, the configuration module 123 may include DPP software and/or legacy provisioning software. The computing device 108 may use the configuration module 123 when generating a configuration identifier for the IoT device during a configuration session.

The certificate authority 110 may have a communications module 127, a configuration module 129, and an access control module 131. The communications module 121 may be configured to send and/or receive communications to/from other devices of the system 100. The communications module 121 may include one or more wireless interfaces, such as an 802.11 radio, a ZigBee radio, a Z-Wave radio, or a Bluetooth™ radio. The communications module 127 may be configured to send and/or receive network communications, such as broadcasting a wireless network and sending/receiving data to/from IoT devices associated with the network. The configuration module 129 may include software the certificate authority 110 may use when configuring a "headless" IoT device to communicate with the network device 106.

Figure 2A:
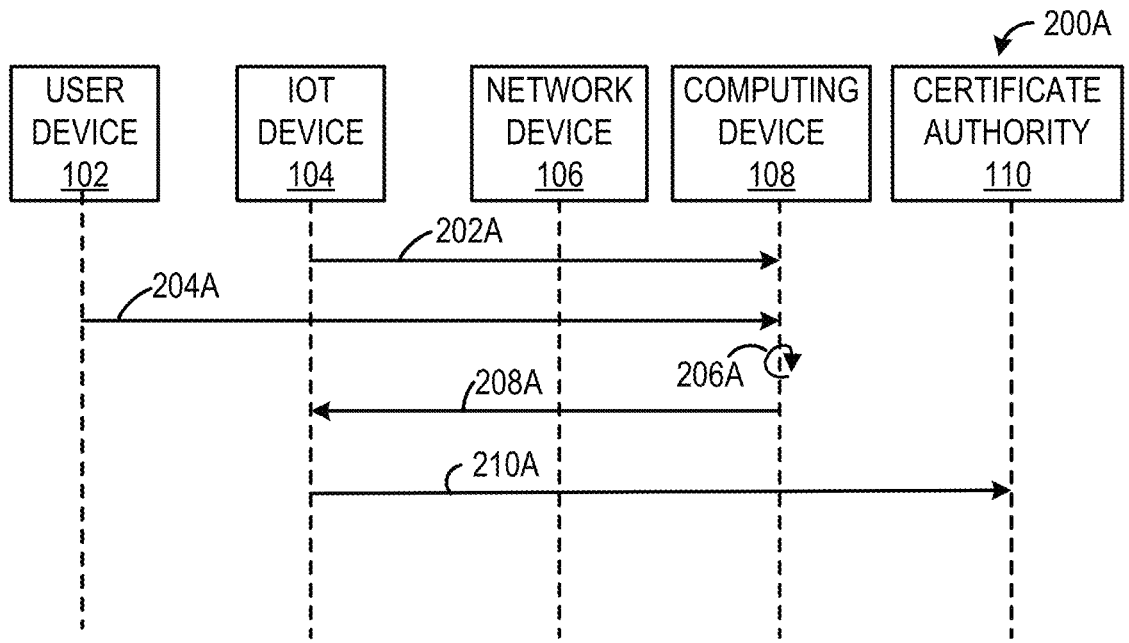
FIGS. 2A-2D show example methods.

Example functionality of each of the devices of the system 100 will be described with reference to FIGS. 2A-2D, each of which shows an example method for the system 100. Turning now to FIG. 2A, example method 200A is shown. The method 200A may be employed when initially configuring and/or reconfiguring the IoT device 104 to communicate with the network device 106. The network device 106 may generate (e.g., broadcast) a network. The network may be a wireless network, such as a WiFi network. In order to access the network, the IoT device 104 may be required to provide network credentials for the network to the network device 106. The network credentials may include, for example, a network name and a network password.

As discussed herein, the IoT device 104 may be configured to communicate with the network device 106 during a configuration session. The configuration session may be a DPP configuration session. The user device 102 may initiate the configuration session on behalf of the IoT device 104. The user device 102 may be in communication with the network device 106. For example, the user device 102 may be in communication with the network device 106 via a first communications protocol and/or a second communications protocol. The first communications protocol may be a Bluetooth™ channel, a ZigBee channel, a Z-Wave channel, a near field communications ("NFC") channel, or any suitable low-energy and/or short-range communications channel. The second communications protocol may be an 802.11 channel, such as a WiFi channel.

At step 202A, the computing device 108 may receive, from the IoT device 104, a first notification. The first notification may be received via a first communications network (sometimes referred to as "the first network"). The computing device 108 may comprise a service provider device such as a server associated with the service provider. The notification may be received from an internet-of-things (IoT) device such as a camera, a thermostat, a sensor, an air purifier, a doorbell, or a remote control or the like. The first notification may comprise a network credential. The first notification may comprise a network credential associated with a second communications network (sometimes referred to as "the second network"). The first notification may comprise at least one of a device identifier associated with the IoT device, an account identifier associated with the IoT device, an authorization status associated with the IoT device, or a registration status associated with the IoT device. The first notification may comprise at least one of: an SSID associated with the second communications network or a password associated with the second communications network. The first notification may be received via a first communications network. The first communications network may comprise network device 106. The gateway device may facilitate communications between networks. For instance, the networks may comprise packet-switched networks. The first communication network may comprise a hidden network. The first communication network may comprise a network wherein a service set identifier (SSID) is not broadcast. The first notification may be associated with an identifier associated with the IoT device. The IoT device may access the first communications network upon initiation. For instance, when the IoT device is powered it, it may scan for a network such as the hidden network and, upon determining the hidden network, may use the hidden network to send the first notification to the computing device 108. The first communication network may be a network configured by the service provider. The first communication network may comprise a WiFi communications network.

At step 204A, a second notification may be received. The second notification may be received by the computing device 108. The second notification may be received from a mobile device. The second notification may comprise a token. The token may comprise a security token. The security token may comprise at least one of a CIMA token or a SAT token. Either of the tokens may comprise a user identity or service identity. In an example, the security token may be sent, via the first communication network, to the IoT device. The second notification may comprise an identifier associated with a mobile device, such as a device identifier, account identifier, SSID, or the like. The second notification may comprise at least one of: a device identifier associated with the mobile device, a device identifier associated with the IoT device, an account identifier associated with the mobile device, an authorization status associated with the mobile device, or a registration status associated with the mobile device. The authorization status may indicate whether the mobile device is allowed on the first communications network or the second communications network. The registration status may indicate whether the mobile device is associated with a user account and/or a service provider account. The second notification may be received via the second communication network. The mobile device may comprise at least one of a smartphone, computer, laptop, or tablet. The second communications network may comprise a visible network. The second communications network may comprise the gateway. The second network may comprise a WiFi network. The second network may comprise a network wherein the SSID is broadcast, for instance by the gateway device. The second network may comprise a network configured by a user. The second notification may be received based on a scanned identifier. The scanned identifier may comprise a physical indicator affixed to the IoT device. For example, the scanned identifier may comprise at least one of a quick response (QR) code or a universal purchase code (UPC), or the like. For example, the mobile device may scan the QR code or UPC and thereby determine a device identifier associated with the IoT device.

At step 206A, a network work credential may be determined. The network credential may be associated with the second communication network. The network credential may be determined by the computing device 108. The network credential may be determined by the computing device 108 based on the first notification and the second notification. For example, determining the network credential may comprise determining that the device identifier associated with the IoT device in the first notification matches the device identifier associated with the IoT device in the second notification. Further, determining the network credential may comprise determining, based on the match, account information associated with the mobile device, wherein the account information comprises the network credential.

At step 208A, the network credential associated with the second communications network may be sent to the IoT device. For instance, the network credential associated with the second communications network may be sent to the IoT device via the first communications network.

At communication flow 210A, the IoT device 104 may be caused to communicate with the certificate authority 110. The IoT device may be caused to communicate with the certificate authority via the second communications network. The IoT device may be caused to communicate with the certificate authority via the second communications network based on the network credential associated with the second communications network. Causing the IoT device to communicate with the certificate authority via the second communications network may comprise causing the IoT device to execute a certificate authority method. The certificate authority method may comprise establishing a communication session between the IoT device and the certificate authority. Establishing the communication session between the IoT device and the certificate authority may be based on the network credential. The certificate authority method may comprise generating a key pair, wherein the key pair comprises a public key and a private key. The key pair may be generated by the IoT device. Further, a certificate signing request (CSR) may be generated. The CSR may be generated based on the private key. The CSR, the public key, and the security token may be sent to the certificate authority. The CSR, the public key, and the security token may be sent to the certificate authority via the second communications network. In response, a signed CSR (e.g., digital certificate) may be received from the certificate authority. The signed CSR may be received from the certificate authority via the second communications network.

Figure 2B:
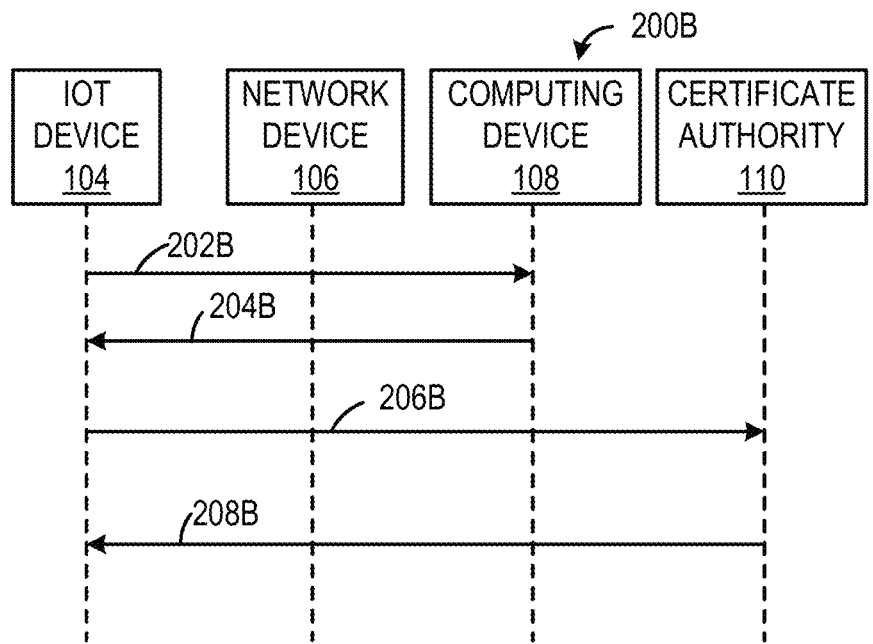

Turning now to FIG. 2B, example method 200B is shown. The method 200B may be employed when the IoT device 104 is pre-configured to communicate with the network device 106 (i.e., the user device 102 is not required as an intermediary between the IoT device 104 and the network device 106). The network device 106 may be, for example, a network gateway/router.

At step 202B, a first notification may be sent from the IoT device 104 to the computing device 108. The first notification may be sent via WiFi network. The first notification may be sent to a computing device. The first notification may be sent to the computing device by an internet-of-things (IoT) device. The first notification may be sent to the computing device, by the IoT device, via a first communications network. The computing device may comprise a server associated with a service provider. The first communications network may comprise a gateway device. The first notification may comprise an identifier associated with the IoT device. The identifier associated with the IoT device may comprise at least one of: a device identifier associated with the IoT device, an account identifier associated with the IoT device, an authorization status associated with the IoT device, or a registration status associated with the IoT device. The IoT device may comprise a camera, a thermostat, a sensor, an air purifier, a doorbell, or a remote control or the like. The first communications network may comprise a hidden network and wherein the second communications network comprises a visible network. The first communications network may be associated with a service set identifier (SSID) that is not broadcast by the gateway device. The first communications network may comprise a network configured by a service provider. The first communications network may comprise a first WiFi communications network. The first notification may comprise an identifier associated with an account.

At step 204B, a security token may be received by the IoT device 104 from the computing device 108. Further, at step 204B, a network credential of a second communications network associated with the account may be received. The second communications network may comprise the gateway device. The security token and the network credential of the second communications network associated with the account may be received by the computing device. The network credential may comprise a connection profile. The connection profile may comprise a username and a password. The security token and the network credential of the second communications network associated with the account may be received by the computing device via the first communications network. The security token may comprise at least one of a CIMA token or an SAT token. The second communications network may be comprise a visible network. The second communications network may be associated with an SSID that is broadcast by the gateway device. The second communications network may comprise a WiFi network. The second communications network may comprise a network configured by a user. Determining that the first notification is associated with the account may comprise that an identifier associated with the first notification matches an identifier associated with the account, wherein the account comprises a purchaser account.

At step 206B, the IoT device 104 may establish a communication session with the certificate authority 110. The communication session with the certificate authority may be established via the second communications network. The communication session with the certificate authority may be established via the second communications between based on the network credential. Also at step 206B, a request for an identity certificate may be sent from the IoT device 104 to the certificate authority 110. The request for the identity certificate may be sent via the communication session with the certificate authority. The request for the identity certificate may be sent to the certificate authority. The request for the identity certificate may comprise a certificate signing request (CSR). Sending the request for the identity certificate may comprise sending, to the certificate authority, the request for the identity certificate, the public key, and the security token. Further, in response to sending the identity certificate, the public key, and the security token, receiving, from the certificate authority, via the gateway device, the signed identity certificate.

At step 208B, the identity certificate may be received. The identity certificate may be received from the certificate authority. The identity certificate may be received from the certificate authority, via the communication session.

Figure 2C:
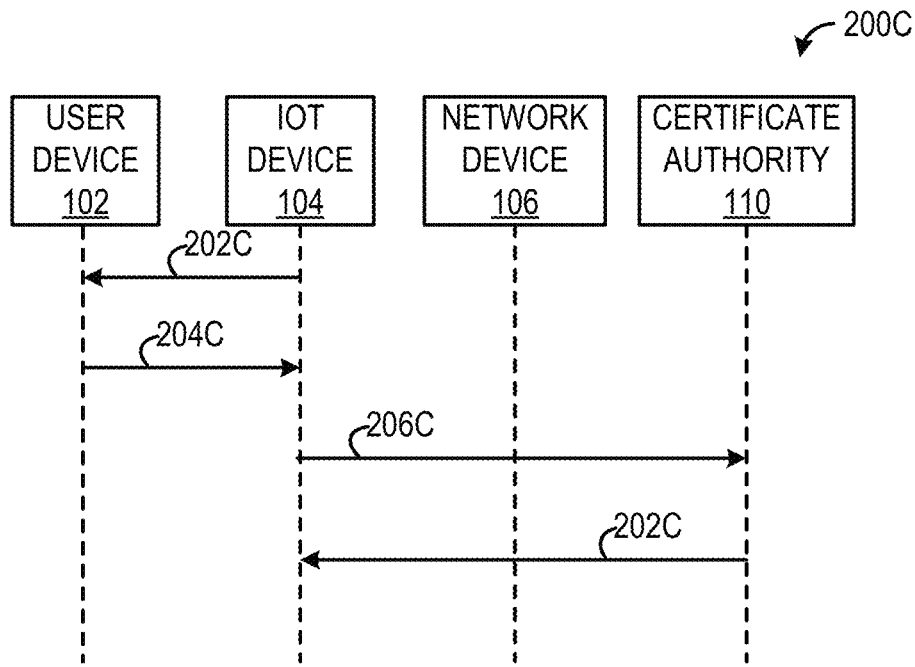

Turning now to FIG. 2C example method 200C is shown. At step 202C, a first communication session may be established between the IoT device 104 and the user device 102. The first communication session may be established with a user device. The first communication session may be established by an IoT device. The user device may comprise at least one of a camera, a thermostat, a sensor, an air purifier, a doorbell, or a remote control, or the like. The mobile device may comprise at least one of a smartphone, computer, laptop, tablet, or the like configured to process a scanned identifier. The first communication session may comprise a short range communications protocol. For example the first communication session may comprise a Bluetooth, or Bluetooth Low Energy (BLE) communication session.

At step 204C, a security token may be received. The security token may be received by the IoT device 104 from the user device 102. The security token may be received by the IoT device 104 based on the user device 102 scanning a scannable identifier. The security token may be received by the IoT device. The security token may be received from the mobile device. The security token may be received by the IoT device from the mobile device via the first communication session. The security token may comprise at least one of a CIMA token or an SAT token. Receiving the security token may comprise receiving the security token, from the mobile device, based on the scanned identifier associated with the IoT device. For example, the scanned identifier may comprise at least one of a quick response (QR) code or a universal purchase code (UPC), or the like. For example, the mobile device may scan the QR code or UPC and thereby determine a device identifier associated with the IoT device. The IoT device may generate a key pair. The key pair may comprise a public key and a private key. The IoT device may generate, based on the key a request for an identity certificate.

At step 206C, a communication network may be accessed. The communication network may comprise the network device 106. The communications network may be accessed by the IoT device 104. The communications network may be accessed by the IoT device based on a stored network credential associated with the gateway device. The stored network credential may be associated with the gateway device may comprise at least one of an SSID, username, or password.

Also at step 206C, a second communication session may be established. The second communication session may be established between the IoT device and the certificate authority 110 via the network device 106. Establishing the second communication session may comprise establishing a WiFi communication session.

Also at step 206C, a request for an identity certificate may be sent. The request for the identity certificate may be sent via the second communication session. The request for the identity certificate may comprise a CSR. Sending the request for the identity certificate may further comprise sending, via the second communication session, the request for an identity certificate comprises sending, to the certificate authority, the request for an identity certificate, the public key, and the security token, and receiving, from the certificate authority, via the gateway device, a signed identity certificate.

At step 208C, the identity certificate may be received. The identity certificate may be received from the certificate authority 110. The identity certificate may comprise a signed CSR. The identity certificate may be received by the IoT device 104.

Figure 2D:
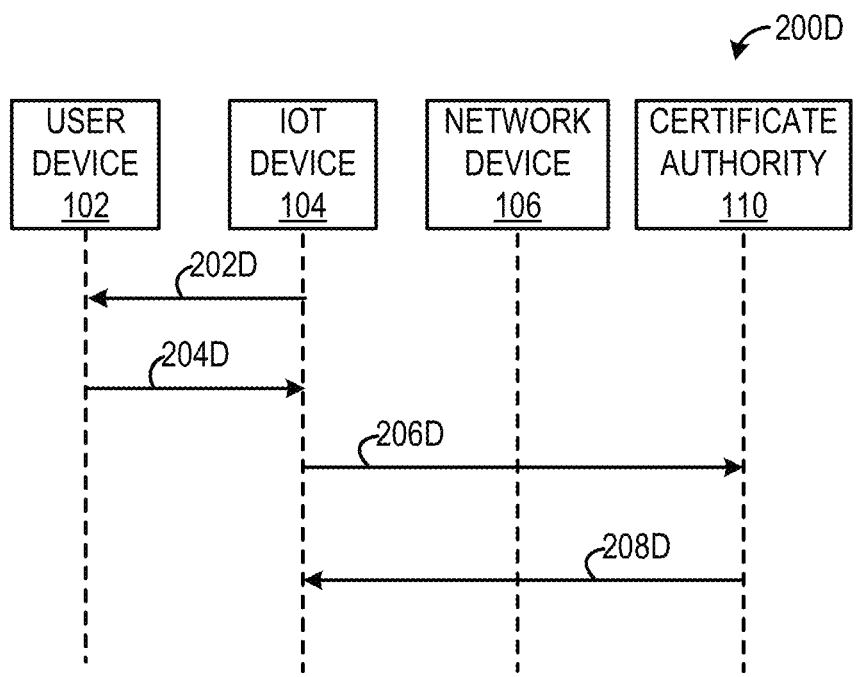

Turning now to FIG. 2D example method 200D is shown. At step 202D, a first communication session between the IoT device 104 and the user device 102. The first communication session may be established with a mobile device. The first communication session may be established with the user device 104 (e.g., the mobile device) by the IoT device 104. The mobile device may comprise at one of a smartphone, computer, laptop, tablet or the like configured to process a scanned identifier. The IoT device may comprise at least one of a camera, a thermostat, a sensor, an air purifier, a doorbell, remote control, voice enabled device, or the like. The first communication session may comprise a Bluetooth connection.

At step 204D, a network credential associated with the network device 106 may be received. The network credential associated with the gateway device may be received from the user device 102. The network credential associated with the gateway device may be received from the user device 102 by the IoT device 104 via the first communication session. Receiving the network credential associated with the gateway device may comprise receiving the network credential from the mobile device based on an initialization application. The initialization application may be initiated upon powering on the IoT device.

Also at step 204D, a security token may be received. The security token may be received by the IoT device 104. The security token may be received from the user device 102.

The security token may be received by the IoT device, from the mobile device, via the first communication session. The security token may comprise at least one of a CIMA token or an SAT token.

At step 206D, a second communication session may be established. The second communication session may be established between the IoT device 104 and the certificate authority 110. The second communication session may be established via the network device 106. The second communication session may be stablished with the certificate authority 110 based on the network credential associated with the network device 106. The second communication session may be established with the certificate authority via the gateway device. The second communication session may be associated with a long range communications protocol.

Also at communication flow 206D, a request for identity certificate may be sent. The request for the identity certificate may be sent via the second communication session. The request for the identity certificate may comprise a certificate signing request (CSR). Sending, via the second communication session, the request for an identity certificate may comprise sending, to the certificate authority, the request for an identity certificate, a public key, and the security token, and receiving, from the certificate authority, via the gateway device, a signed identity certificate.

At step 208D, the identity certificate may be received. The identity certificate may be received via the second communication session. The identity certificate may be received from the certificate authority via the second communication session.

As described herein, the IoT device 104 may be, as an example, a smart device lacking a graphical user interface for configuring the IoT device 104 and the network device 106 may be, for example, a router or a gateway. Accordingly, the methods described in FIG. 2B may allow the network device 106 to configure and/or configure the IoT device 104 to communicate with the network. For example, the method 200B may be employed when the IoT device was previously configured to communicate with the router using a legacy configuration technique and the smart device subsequently becomes DPP-capable. The smart device may have been DPP-capable initially when it was previously configured using the legacy configuration technique. The smart device may subsequently perform a software and/or firmware update to become DPP-capable and send a request to the router to begin a DPP configuration session. The router may receive the request from the smart device and initiate a DPP configuration session with the smart device using a secure provisioning channel (e.g., the configuration channel/secure WiFi channel described herein). The router may provide the smart device with network credentials via the DPP configuration session, such as a network name and/or network password, via the secure provisioning channel.

The IoT device 104 may have a private key stored in the configuration module 113 that corresponds to the identifier 111. The IoT device 104 may use the private key that corresponds to the identifier 111 to decrypt the hash of the identifier 111. The IoT device 104 may have a private key stored in the configuration module 113 that corresponds to the configuration identifier. The IoT device 104 may use the private key that corresponds to the configuration identifier to decrypt the hash of the configuration identifier. In this way, the IoT device 104 may receive the configuration message (e.g., along with the hash of the configuration identifier and/or the hash of the identifier 111) and determine whether the sender of the configuration message (e.g., the network device 106) is a trusted device. For example, the IoT device 104 may determine that the network device 106 is a trusted device based on the hash of the configuration identifier—once decrypted using the private key associated with the configuration identifier—including the configuration identifier. As another example, the IoT device 104 may determine that the network device 106 is a trusted device based on the hash of the identifier 111—once decrypted using the private key associated with the identifier 111—including the identifier 111.

As described herein, the IoT device 104 may be, as an example, a smart device lacking a graphical user interface for configuring the IoT device 104 and the network device 106 may be, for example, a router. As another example, the IoT device 104 may not be a "headless" device. That is, the IoT device 104 may be computing device comprising a screen/display, such as a mobile device or any other Internet-capable device having a screen/display (e.g., for a graphical user interface).

Figure 3:
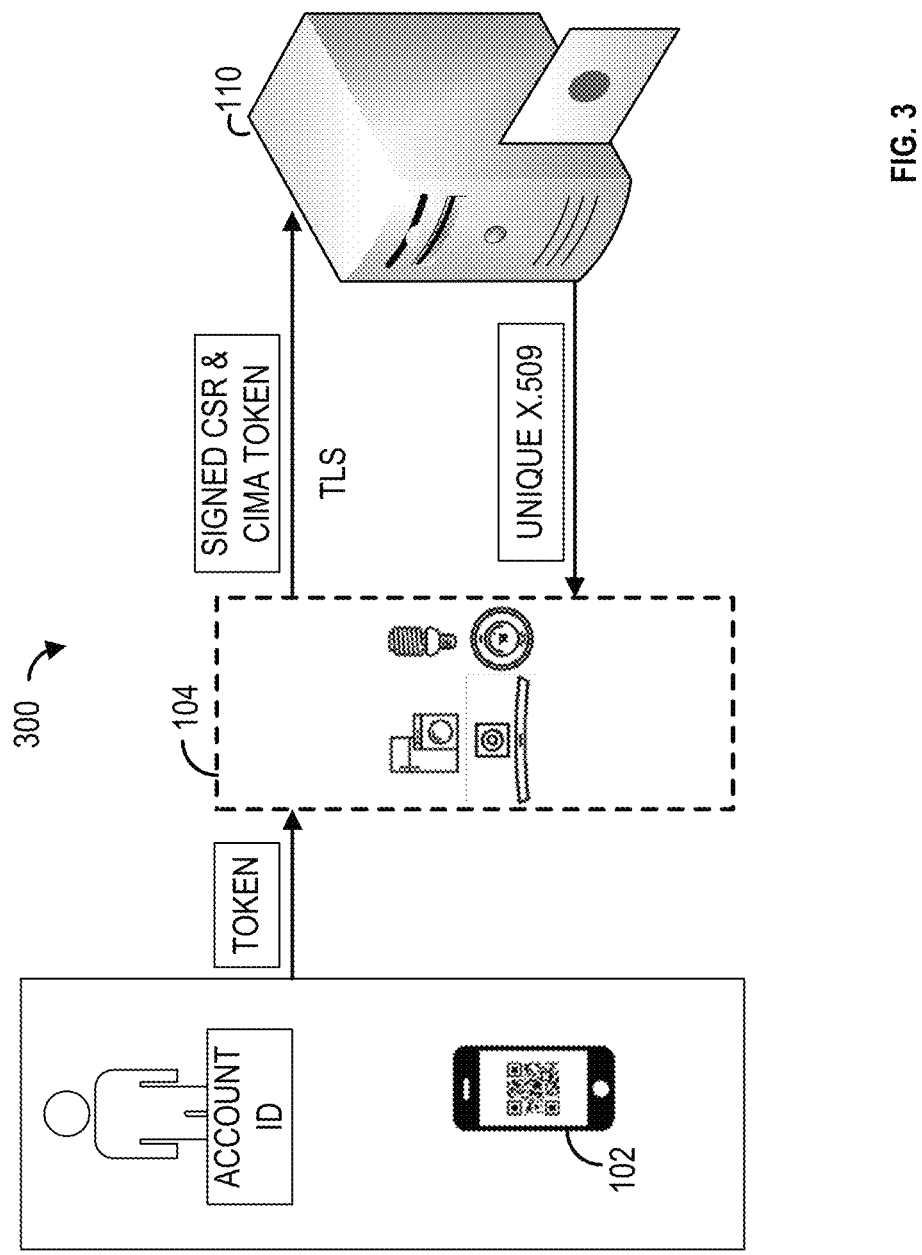
FIG. 3 shows an example method.

FIG. 3 is an example method 300 for network management. The method 300 may facilitate unique key X.509 provisioning or the like. For example, a user may log in to an application. The application may comprise an authenticated application. In order to log into the application, the user may enter credentials such as a name, password, account identifier, or the like. Logging into the application may enable the application. The application, by way of the camera, may determine an identifier associated with a device such as the IoT device (e.g., the IoT device 104). The identifier may be associated with an image, for instance a QR code or UPC. Determining the identifier may comprise scanning the image via a camera located on the user device (e.g., the user device 102). The user device 102 may comprise a smart phone, tablet, computer, laptop, or the like or any other suitable computing device as described herein. Scanning the identifier may cause the user device 102 to send a token to the IoT device 104. For instance, the user device 102 may send a CIMA token to the IoT device 104. The IoT device 104 may generate a key pair. The key pair may comprise a public key and private key. The IoT device 104 may generate a certificate signing request (CSR). The IoT device 104 may encrypt the CSR and the token. The CSR and token may be encrypted at the transport layer security (TLS). The IoT device 104 may send the CSR and the token to a certificate authority, such as a public key infrastructure (PKI) server. Based on the CSR and the token, the certificate authority may authenticate the IoT device 104. Authenticating the IoT device 104 may comprise associating either the token or the CSR with an account, for instance a user account associated with the user and a service provider. The certificate authority may complete the CSR and send, to the IoT device 104, a unique certificate such as an X.509 certificate. The certificate may comprise a structured, binary record. The certificate may comprise at least one key encoded using techniques known in the art such as standard Abstract Syntax Notation (ASN). The unique certificate may comprise identifiers such as a common name, an organization unit or the like or hashes thereof.

Figure 4:
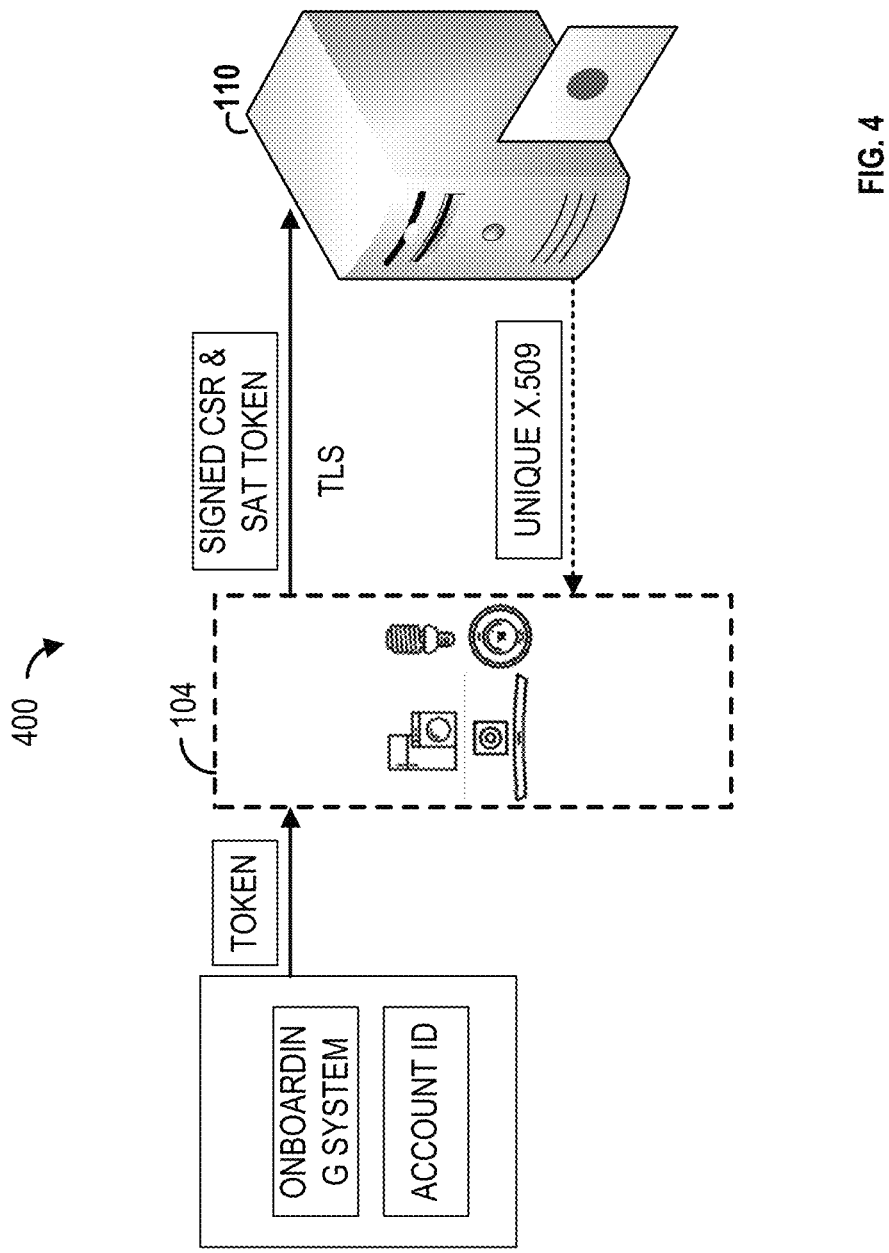
FIG. 4 shows an example method.

FIG. 4 is an example method 400. The method 400 may facilitate unique key provisioning. In method 400, an IoT device (e.g., the IoT device 104) may be powered on. The IoT device may comprise an onboarding system. The onboarding system may be associated with identifiers such as an account identifier. When the IoT device is powered on, it may receive a token such as an SAT token from the onboarding system. The token may be sent to the IoT device during provisioning calls. Based on receiving the token, the IoT device may generate a certificate signing request (CSR).

The IoT device may create a key pair. The key pair may comprise a public key and a private key. The public key and the private key may comprise difference values. They key pair may use assymetric encryption algorithms such as elliptical curve cryptography (ECC), RSA, DSA, or ECDSA as are known in the art. The IoT device may, based on the token, download the CSR. The IoT device may send, to a certificate authority, the CSR, the public key or the token or a combination thereof. The IoT device may send the CSR and the token to the certificate authority over a network such as a WiFi network. Based on the CSR and the token, the certificate authority may authenticate the IoT device. Authenticating the IoT device may comprise associating either the token or the CSR with an account, for instance a user account associated with the user and a service provider. The certificate authority may complete the CSR and send, to the IoT device, a unique certificate such as an X.509 certificate. The unique certificate may comprise identifiers such as a common name, an organization unit or the like or hashes thereof. For instance, a hashing algorithm such as SHA256, or any other suitable algorithm may be used.

Figure 5:
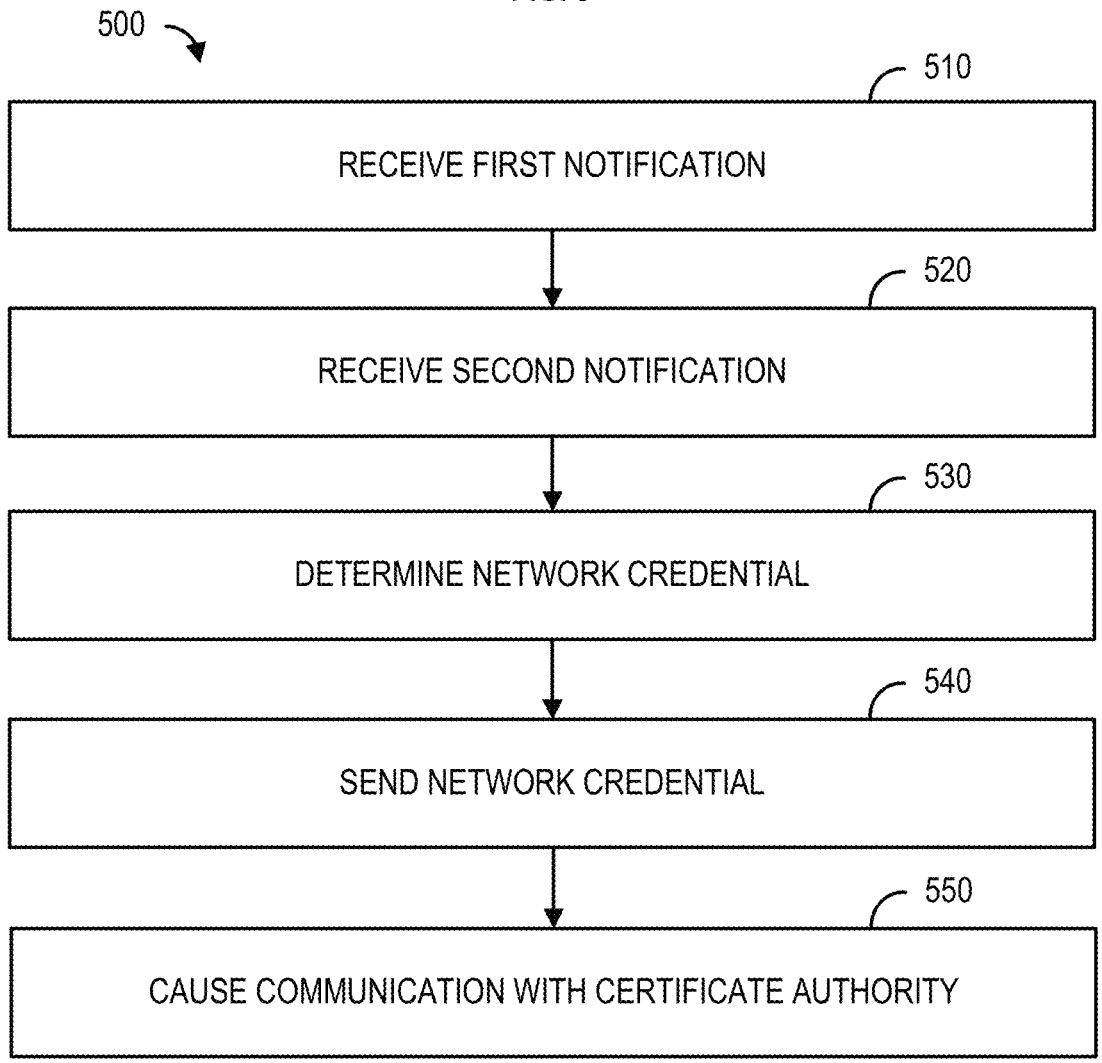
FIG. 5 shows a flowchart of an example method.

FIG. 5 is a flowchart illustrating an example method 500 for network management. The method 500 may be implemented using the devices of the system 100. For example, the method 500 may be implemented by a first computing device, such as the IoT device 104 (e.g., IoT device) or any other suitable computing device as described herein. A second computing device may comprise a user device (e.g., mobile device). The user device may comprise a mobile phone, a laptop, a tablet, a computer or the like. A scanned identifier associated with the IoT device may be decoded by the user device from an image, physical indicator or other representation of the identifier captured by the user device. As another example, the user device may receive the identifier from the IoT device via a message sent by the IoT device using a wireless interface. A third computing device may comprise a network device such as a server (e.g., computing device 108 or 110).

At step 510, a first notification may be received. The first notification may be received by a first computing device. The first notification may be received via a first communications network (sometimes referred to as "the first network"). The first computing device may comprise a service provider device such as a server associated with the service provider. The notification may be received from an internet-of-things (IoT) device such as a camera, a thermostat, a sensor, an air purifier, a doorbell, or a remote control or the like. The first notification may comprise a network credential. The first notification may comprise a network credential associated with a second communications network (sometimes referred to as "the second network"). The first notification may comprise at least one of a device identifier associated with the IoT device, an account identifier associated with the IoT device, an authorization status associated with the IoT device, or a registration status associated with the IoT device. The first notification may comprise at least one of: an SSID associated with the second communications network or a password associated with the second communications network. The first notification may be received via a first communications network. The first communications network may comprise a gateway device. The gateway device may facilitate communications between networks. For instance, the networks may comprise packet-switched networks. The first communication network may comprise a hidden network. The first communication network may comprise a network wherein a service set identifier (SSID) is not broadcast. The first notification may be associated with an identifier associated with the IoT device. The IoT device may access the first communications network upon initiation. For instance, when the IoT device is powered it, it may scan for a network such as the hidden network and, upon determining the hidden network, may use the hidden network to send the first notification to the first computing device. The first communication network may be a network configured by the service provider. The first communication network may comprise a WiFi communications network.

At step 520, a second notification may be received. The second notification may be received by the first computing device. The second notification may be received from a mobile device. The second notification may comprise a token. The token may comprise a security token. The security token may comprise at least one of a CIMA token or a SAT token. Either of the CIMA token or the SAT token may comprise a user identity or a service identity. In an example, the security token may be sent, via the first communication network, to the IoT device. The second notification may comprise an identifier associated with a mobile device, such as a device identifier, account identifier, SSID, or the like. The second notification may comprise at least one of: aa device identifier associated with the mobile device, a device identifier associated with the IoT device, an account identifier associated with the mobile device, an authorization status associated with the mobile device, or a registration status associated with the mobile device. The authorization status may indicate whether the mobile device is allowed on the first communications network or the second communications network. The registration status may indicate whether the mobile device is associated with a user account and/or a service provider account. The second notification may be received via the second communication network. The mobile device may comprise at least one of a smartphone, computer, laptop, or tablet. The second communications network may comprise a visible network. The second communications network may comprise the gateway. The second network may comprise a WiFi network. The second network may comprise a network wherein the SSID is broadcast, for instance by the gateway device. The second network may comprise a network configured by a user. The second notification may be received based on a scanned identifier. The scanned identifier may comprise a physical indicator affixed to the IoT device. For example, the scanned identifier may comprise at least one of a quick response (QR) code or a universal purchase code (UPC), or the like. For example, the mobile device may scan the QR code or UPC and thereby determine a device identifier associated with the IoT device.

Determining the device identifier associated with the IoT device may comprise scanning, by the mobile device, the QR code or UPC, or other physical indicator affixed to or associated with the IoT device, and converting the scan of the physical indicator to a device identifier. For example, the QR code may not be literally affixed to the IoT device but rather may be affixed to paperwork (e.g., a receipt) which accompanies the IoT device.

At step 530, a network credential may be determined. The network credential may be associated with the second communication network. The network credential may be determined by the first computing device. The network credential may be determined by the first computing device based on the first notification and the second notification. For example, determining the network credential may comprise determining that the device identifier associated with the IoT device in the first notification matches the device identifier associated with the IoT device in the second notification.

Further, determining the network credential may comprise determining, based on the match, account information associated with the mobile device, wherein the account information comprises the network credential.

At step 540, the network credential associated with the second communications network may be sent to the IoT device. For instance, the network credential associated with the second communications network may be sent to the IoT device via the first communications network.

At step 550, the IoT device may be caused to communication with a certificate authority. The IoT device may be caused to communicate with the certificate authority via the second communications network. The IoT device may be caused to communicate with the certificate authority via the second communications network based on the network credential associated with the second communications network. Causing the IoT device to communicate with the certificate authority via the second communications network may comprise causing the IoT device to execute a certificate authority method. The certificate authority method may comprise establishing a communication session between the IoT device and the certificate authority. Establishing the communication session between the IoT device and the certificate authority may be based on the network credential. The certificate authority method may comprise generating a key pair, wherein the key pair comprises a public key and a private key. The key pair may be generated by the IoT device. Further, a certificate signing request (CSR) may be generated. The CSR may be generated based on the private key. The CSR, the public key, and the security token may be sent to the certificate authority. The CSR, the public key, and the security token may be sent to the certificate authority via the second communications network. In response, a signed CSR (e.g., a digital certificate such as x509v3 based document) may be received from the certificate authority. The signed digital certificate may be received from the certificate authority via the second communications network.

Figure 6:
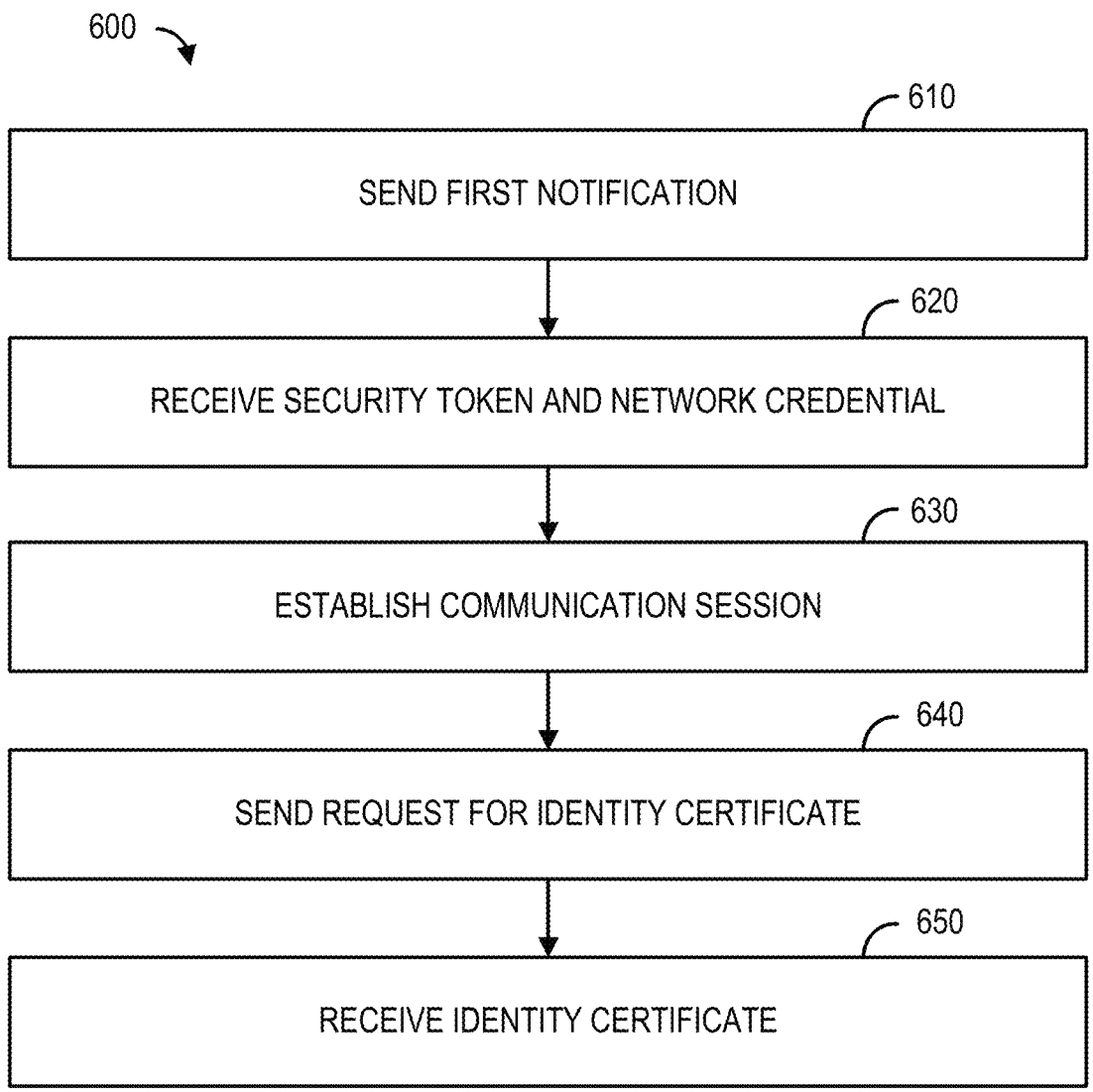
FIG. 6 shows a flowchart of an example method.

FIG. 6 is a flowchart illustrating an example method 600 for network management. The method 600 may be implemented using the devices of the system 100. For example, the method 600 may be implemented by a first computing device, such as the IoT device 104 (e.g., IoT device) or any other suitable computing device as described herein. A second computing device may comprise a user device (e.g., mobile device). The user device may comprise a mobile phone, a laptop, a tablet, a computer or the like. A scanned identifier associated with the IoT device may be decoded by the user device from an image, physical indicator or other representation of the identifier captured by the user device. As another example, the user device may receive the identifier from the IoT device via a message sent by the IoT device using a wireless interface. A third computing device may comprise a network device such as a server (e.g., computing device 108 or 110).

At step 610, a first notification may be sent. The first notification may be sent via WiFi network. The first notification may be sent to a computing device. The first notification may be sent to the computing device by an internet-of-things (IoT) device. The first notification may be sent to the computing device, by the IoT device, via a first communications network. The computing device may comprise a server associated with a service provider. The first communications network may comprise a gateway device. The first notification may comprise an identifier associated with the IoT device. The identifier associated with the IoT device may comprise at least one of: a device identifier associated with the IoT device, an account identifier associated with the IoT device, an authorization status associated with the IoT device, or a registration status associated with the IoT device. The IoT device may comprise a camera, a thermostat, a sensor, an air purifier, a doorbell, or a remote control or the like. The first communications network may comprise a hidden network and wherein the second communications network comprises a visible network. The first communications network may be associated with a service set identifier (SSID) that is not broadcast by the gateway device. The first communications network may comprise a network configured by a service provider. The first communications network may comprise a first WiFi communications network. The first notification may comprise an identifier associated with an account.

At step 620, a security token may be received. Further, at step 620, a network credential of a second communications network associated with the account may be received. The second communications network may comprise the gateway device. The security token and the network credential of the second communications network associated with the account may be received by the computing device. The network credential may comprise a connection profile. The connection profile may comprise a username and a password. The security token and the network credential of the second communications network associated with the account may be received by the computing device via the first communications network. The security token may comprise at least one of a CIMA token or an SAT token. The security token may comprise a user identity or a service identity or combinations thereof. The second communications network may be comprise a visible network. The second communications network may be associated with an SSID that is broadcast by the gateway device. The second communications network may comprise a WiFi network. The second communications network may comprise a network configured by a user.

Determining that the first notification is associated with the account may comprise that an identifier associated with the first notification matches an identifier associated with the account, wherein the account comprises a purchaser account.

At step 630, a communication session with a certificate authority may be established. The communication session with the certificate authority may be established via the second communications network. The communication session with the certificate authority may be established via the second communications between based on the network credential.

At step 640, a request for an identity certificate may be sent. The request for the identity certificate may be sent via the communication session with the certificate authority. The request for the identity certificate may be sent to the certificate authority. The request for the identity certificate may comprise a certificate signing request (CSR). Sending the request for the identity certificate may comprise sending, to the certificate authority, the request for the identity certificate, the public key, and the security token. Further, in response to sending the identity certificate, the public key, and the security token, receiving, from the certificate authority, via the gateway device, the signed identity certificate.

At step 650, the identity certificate may be received. The identity certificate may be received from the certificate authority. The identity certificate may be received from the certificate authority, via the communication session.

The method 600 may further comprise generating a key pair. The key pair may comprise a public key and a private key. The key pair may be generated by the IoT device.

Further, the request for the identity certificate may be generated based on the key pair.

The method 600 may further comprise sending, via the second communications network, the signed identity certificate and the public key to an IoT application server. The method 600 may further comprise receiving, from the IoT application server, a public key associated with the IoT application server. The method 600 may further comprise encrypting, based on the public key associated with the IoT application server, IoT data. The method 600 may further comprise sending, via the second communications network, the encrypted IoT data to the IoT application server.

The method 600 may further comprise receiving, from the IoT application server, data encrypted using the public key, and decrypting, based on the private key, the encrypted data.

Figure 7:
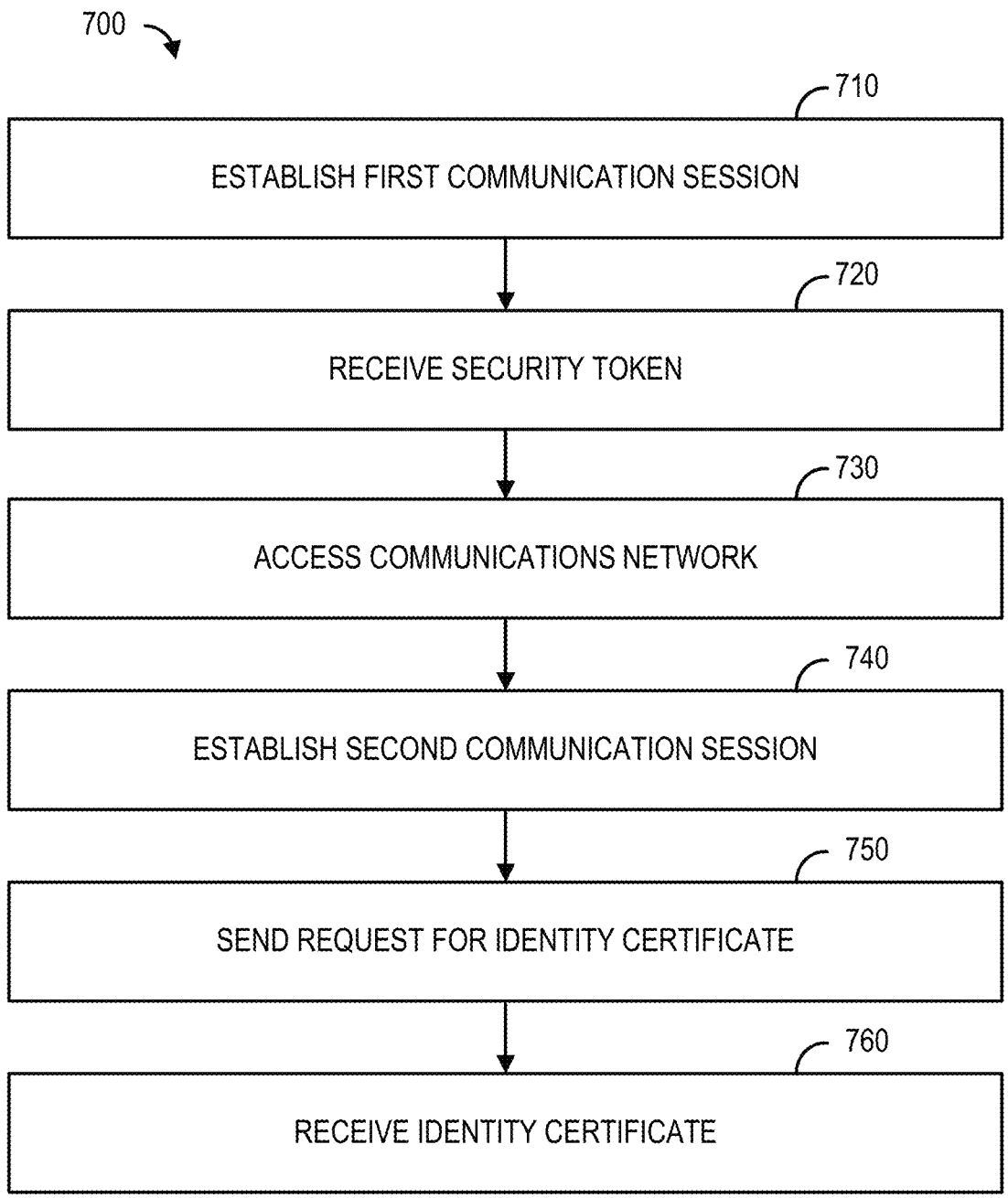
FIG. 7 shows a flowchart of an example method.

FIG. 7 shows an example method 700 for network management. The method 700 may be implemented using the devices of the system 100. For example, the method 700 may be implemented by a first computing device, such as the IoT device 104 (e.g., IoT device) or any other suitable computing device as described herein. A second computing device may comprise a user device (e.g., mobile device). The user device may comprise a mobile phone, a laptop, a tablet, a computer or the like. A scanned identifier associated with the IoT device may be decoded by the user device from an image, physical indicator or other representation of the identifier captured by the user device. As another example, the user device may receive the identifier from the IoT device via a message sent by the IoT device using a wireless interface. A third computing device may comprise a network device such as a server (e.g., computing device 108 or 110).

At step 710, a first communication session may be established. The first communication session may be established with a mobile device. The first communication session may be established by an IoT device. The mobile device may comprise at least one of a camera, a thermostat, a sensor, an air purifier, a doorbell, or a remote control, or the like. The mobile device may comprise at least one of a smartphone, computer, laptop, tablet, or the like configured to process a scanned identifier. The first communication session may comprise a short range communications protocol. For example the first communication session may comprise a Bluetooth, or Bluetooth Low Energy (BLE) communication session.

At step 720, a security token may be received. The security token may be received by the IoT device. The security token may be received from the mobile device. The security token may be received by the IoT device from the mobile device via the first communication session. The security token may comprise at least one of a CIMA token or an SAT token. The security token may comprise a user identity or a service identity or a combination thereof. Receiving the security token may comprise receiving the security token, from the mobile device, based on the scanned identifier associated with the IoT device. For example, the scanned identifier may comprise at least one of a quick response (QR) code or a universal purchase code (UPC), or the like. For example, the mobile device may scan the QR code or UPC and thereby determine a device identifier associated with the IoT device.

At step 730, a communications network may be accessed. The communications network may be associated with a gateway device. The communications network may be accessed by the IoT device. The communications network may be accessed by the IoT device based on a stored network credential associated with the gateway device. The stored network credential may be associated with the gateway device may comprise at least one of an SSID, username, or password.

At step 740, a second communication session may be established. The second communication session may be established with a certificate authority. The second communication session with the certificate authority may be established via the communications network. Establishing the second communication session may comprise establishing a WiFi communication session.

The method 700 may further comprise generating, by the IoT device, a key pair. The key pair may comprise a public key and a private key. The method 700 may further comprise generating, based on the private key, a request for an identity certificate.

At step 750, the request for the identity certificate may be sent. The request for the identity certificate may be sent via the second communication session. The request for the identity certificate may comprise a CSR. Sending the request for the identity certificate may further comprise sending, via the second communication session, the request for an identity certificate comprises sending, to the certificate authority, the request for an identity certificate, the public key, and the security token, and receiving, from the certificate authority, via the gateway device, a signed identity certificate.

At step 760, the identity certificate may be received. The identity certificate may be received from the certificate authority. The identity certificate may comprise a signed CSR. The identity certificate may be received by the IoT device.

The method 700 may further comprise sending, via the communications network, the signed identity certificate and the public key to an IoT application server. The method 700 may further comprise receiving, from the IoT application server, a public key associated with the IoT application server. The method 700 may further comprise encrypting, based on the public key associated with the IoT application server, IoT data. The method 700 may further comprise sending, via the gateway device, the encrypted IoT data to the IoT application server. The method 700 may further comprise receiving, from the IoT application server, data encrypted using the public key. The method 700 may further comprise decrypting, based on the private kay, the encrypted data.

Figure 8:
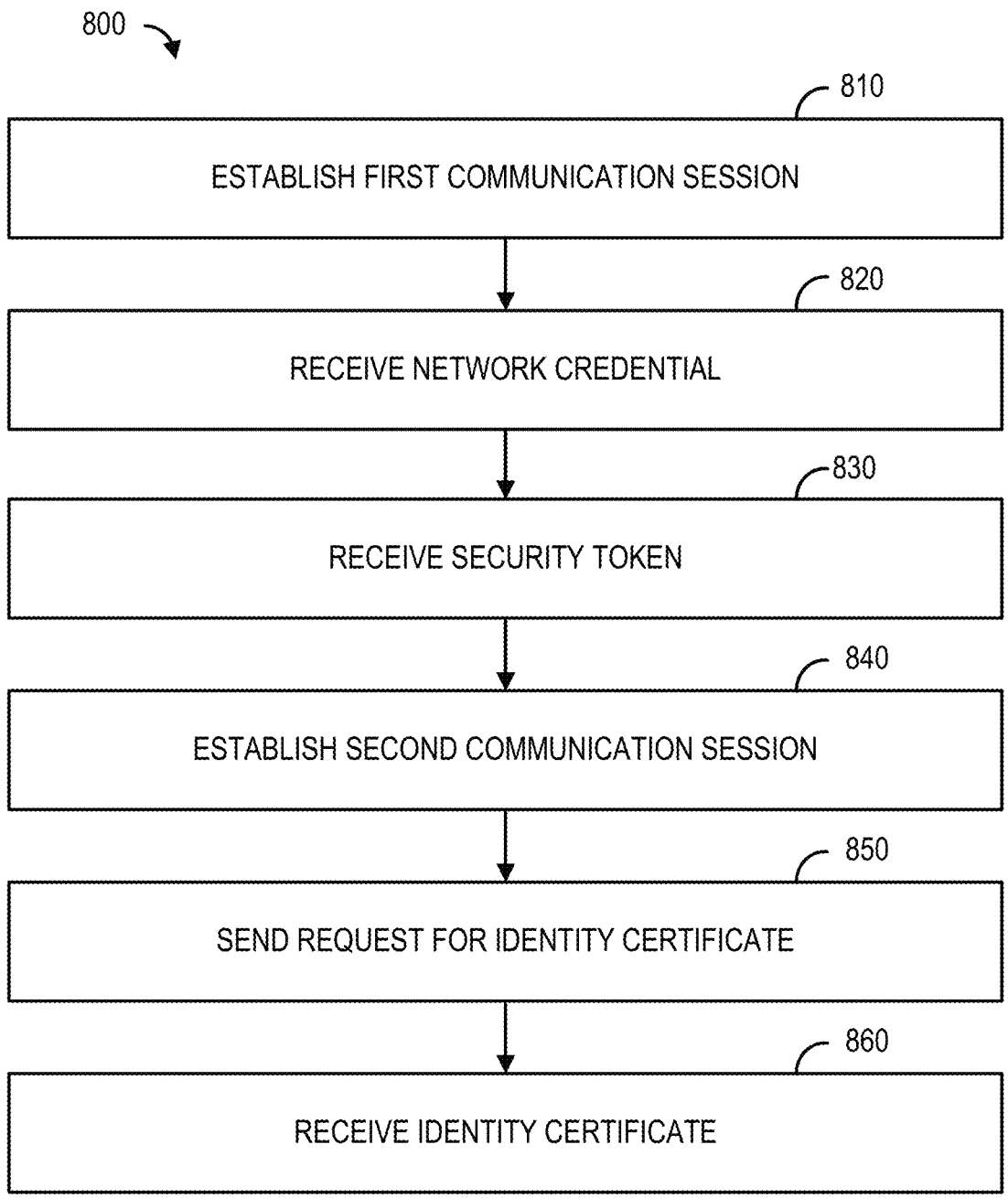
FIG. 8 shows a flowchart of an example method.

FIG. 8 shows an example method 800 for network management. The method 800 may be implemented using the devices of the system 100. For example, the method 800 may be implemented by a first computing device, such as the IoT device 104 (e.g., IoT device) or any other suitable computing device as described herein. A second computing device may comprise a user device (e.g., mobile device). The user device may comprise a mobile phone, a laptop, a tablet, a computer or the like. A scanned identifier associated with the IoT device may be decoded by the user device from an image, physical indicator or other representation of the identifier captured by the user device. As another example, the user device may receive the identifier from the IoT device via a message sent by the IoT device using a wireless interface. A third computing device may comprise a network device such as a server (e.g., computing device 108 or 110).

At step 810, a first communication session may be established. The first communication session may be established with a mobile device. The first communication session may be established with the mobile device by an IoT device. The mobile device may comprise at one of a smartphone, computer, laptop, tablet or the like configured to process a scanned identifier. The IoT device may comprise at least one of a camera, a thermostat, a sensor, an air purifier, a doorbell, remote control, voice enabled device, or the like. The first communication session may comprise a Bluetooth connection.

At step 820, a network credential associated with a gateway device may be received. The network credential associated with the gateway device may be received from the mobile device. The network credential associated with the gateway device may be received from the mobile device by the IoT device via the first communication session. Receiving the network credential associated with the gateway device may comprise receiving the network credential from the mobile device based on an initialization application. The initialization application may be initiated upon powering on the IoT device.

At step 830, a security token may be received. The security token may be received by the IoT device. The security token may be received from the mobile device. The security token may be received by the IoT device, from the mobile device, via the first communication session. The security token may comprise at least one of a CIMA token or an SAT token. The security token may comprise a user identity, a service identity, or combinations thereof.

At step 840, a second communication session may be established. The second communication session may be established with a certificate authority. The second communication session may be stablished with the certificate authority based on the network credential associated with the gateway device. The second communication session may be established with the certificate authority via the gateway device. The second communication session may be associated with a long range communications protocol.

At step 850, a request for an identity certificate may be sent. The request for the identity certificate may be sent via the second communication session. The request for the identity certificate may comprise a certificate signing request (CSR). Sending, via the second communication session, the request for an identity certificate, may comprise sending, to the certificate authority, the request for an identity certificate, a public key, and the security token, and receiving, from the certificate authority, via the gateway device, a signed identity certificate.

At step 860, the identity certificate may be received. The identity certificate may be received via the second communication session. The identity certificate may be received from the certificate authority via the second communication session.

The method 800 may further comprise receiving, by the mobile device, the security token from a computing device. The computing device may comprise a service provider server. The method 800 may further comprise generating, by the IoT device, a key pair wherein the key pair comprises a private key and the public key. The method 800 may further comprise generating, based on the private key, the request for the identity certificate. The method 800 may further comprise sending, via the second communication session, the signed identity certificate and the public key to an IoT application server. The method 800 may further comprise receiving, from the IoT application server, a public key associated with the IoT application server. The method 800 may further comprise encrypting, based on the public key associated with the IoT application server, IoT data. The method 800 may further comprise sending, via the gateway device, the encrypted IoT data to the IoT application server. The method 800 may further comprise receiving, from the IoT application server, data encrypted using the public key.

The method 800 may further comprise decrypting, based on the private key, the encrypted data.

Figure 9:
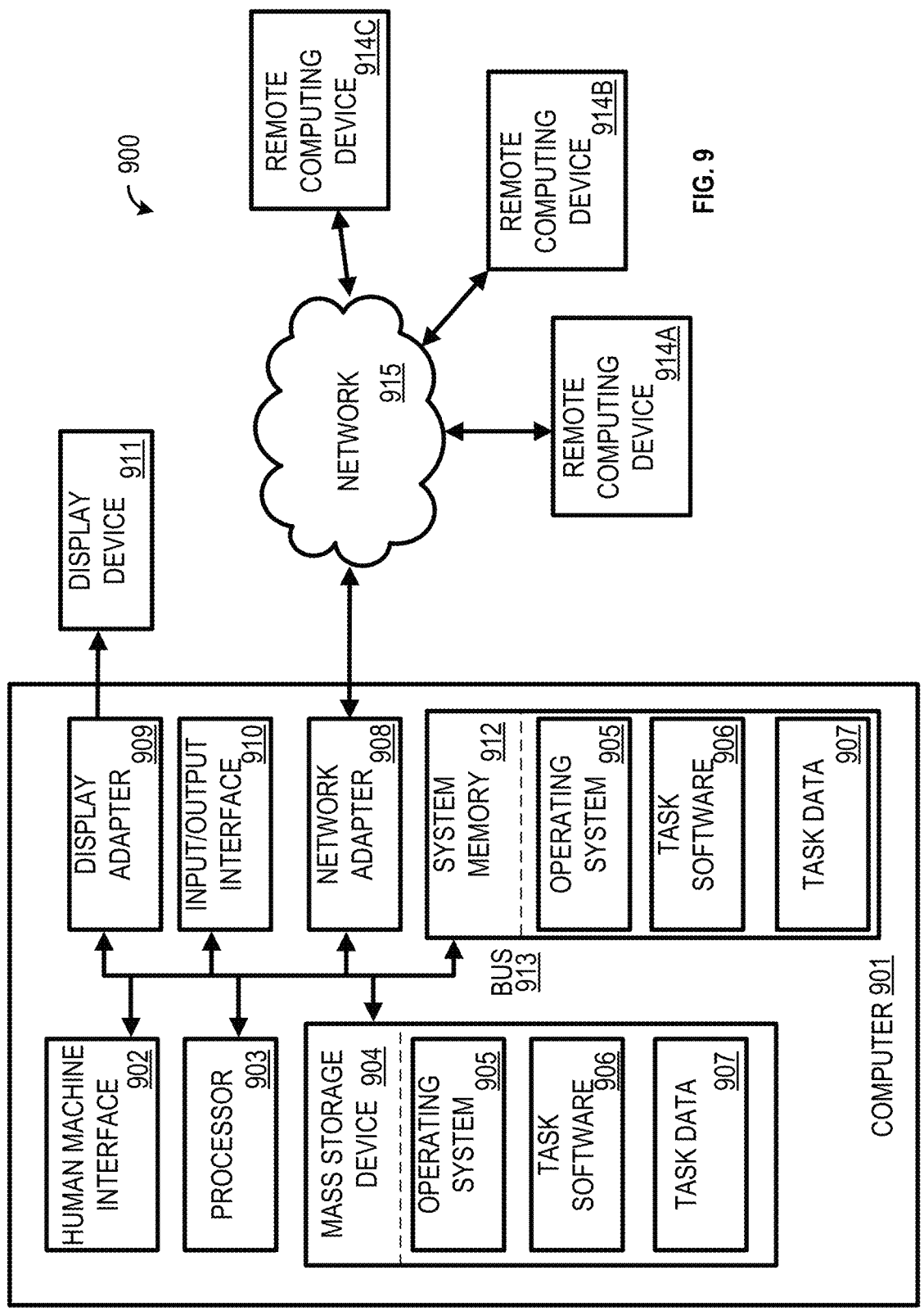
FIG. 9 shows a block diagram of an example computing device.

FIG. 9 is a block diagram illustrating an exemplary operating environment 900 for performing the methods described herein. In an exemplary example, the methods and systems of the present description can be implemented on a computer 901 as illustrated in FIG. 9 and described below. By way of example, each of the devices of FIG. 1 may be a computer 901 as illustrated in FIG. 9. Similarly, the methods and systems described can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and/or the like.

The processing of the described methods and systems can be performed by software components. The described systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The described methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods described herein can be implemented via a general-purpose computing device in the form of a computer 901. The components of the computer 901 can comprise, but are not limited to, one or more processors 903, a system memory 912, and a system bus 913 that couples various system components including the processor 903 to the system memory 912. In the case of multiple processors 903, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and each of the subsystems, including the processor 903, a mass storage device 904, an operating system 905, network software 906, network data 907, a network adapter 917, system memory 912, an Input/Output Interface 910, a display adapter 909, a display device 911, and a human machine interface 902, can be contained within one or more remote computing devices 914 A,B,C at physically separate locations, connected through buses of this form, in effect implementing a fully distributed system.

The computer 901 typically includes a variety of computer readable media. Exemplary readable media can be any available media that is accessible by the computer 901 and includes, for example and not meant to be limiting, both volatile and non-volatile media, removable and non-removable media. The system memory 912 includes computer readable media in the form of volatile memory, such as random access memory (RAM), and/or non-volatile memory, such as read only memory (ROM). The system memory 912 typically contains data, such as network data 907, and/or program modules, such as operating system 905 and network software 906, that are immediately accessible to and/or are presently operated on by the processor 903.

In another example, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and network software 906 (e.g., to encrypt/decrypt network credentials, generate a network, send/receive data to/from an access point, etc.). Each of the operating system 905 and network software 906 (or some combination thereof) can comprise elements of the programming and the network software 906. The network data 907 (e.g., configuration data, public key(s), private key(s), routing table(s), network credentials, etc.) can also be stored on the mass storage device 904. The network data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another example, the user can enter commands and information into the computer 901 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processor 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another example, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components, such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914A,B,C. By way of example, a remote computing device can be a personal computer, portable computer, smartphone, a server, a router, a network computer, a peer device or other common network node, and so on. Logical connections between the computer 901 and a remote computing device 914A,B,C can be made via a network 915, such as a local area network (LAN) and/or a general wide area network (WAN). Such network connections can be through a network adapter 917. A network adapter 917 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 905 are illustrated herein as discrete blocks, although it is recognized that such programs and components reside at various times in different storage components of the computing device 901, and are executed by the data processor(s) of the computer. An implementation of network software 906 can be stored on or transmitted across some form of computer readable media. Any of the described methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice described herein. It is intended that the specification and examples be considered as exemplary only, with a true scope and spirit being indicated by the following claims.

What is claimed is:

1. A method comprising:
   receiving, by a first computing device, from an internet of things (IOT) device, via a first communications network comprising a gateway device, a first notification comprising a first device identifier associated with the IoT device;
   receiving, by the first computing device, from a mobile device, via a second communications network comprising the gateway device, a second notification comprising the first device identifier associated with the IoT device;
   sending, by the first computing device, to the IoT device, via the first communications network, based on both the first notification and the second notification comprising the first device identifier, a network credential associated with the second communications network; and
   causing, based on the network credential associated with the second communications network, the IoT device to communicate with a certificate authority via the second communications network.

2. The method of claim 1, wherein the first computing device comprises a service provider server and wherein the IoT device comprises at least one of: a camera, a thermostat, a sensor, an air purifier, a doorbell, a voice enabled device, a remote control, or the like and wherein the mobile device comprises at least one of a smartphone, a computer, a laptop, or a tablet.

3. The method of claim 1, wherein the first communications network comprises a network configured by a service provider, and wherein the second communications network comprises a network configured by a user, and wherein the first notification comprises a request for the network credential associated with the second communications network and wherein the second notification comprises a token.

4. The method of claim 1, wherein receiving the second notification comprises receiving, from the mobile device, based on a scanned identifier, the second notification wherein the scanned identifier is associated with the IoT device, and wherein the scanned identifier comprises a physical indicator affixed to the IoT device.

5. The method of claim 1, wherein receiving the second notification comprising the first device identifier associated with the IoT device further comprises:
   scanning, by the mobile device, a physical indicator affixed to the IoT device; and
   converting the scan of the physical indicator to the first device identifier in the second notification.

6. The method of claim 1, further comprising:
   determining that the first device identifier in the first notification matches the first device identifier in the second notification; and
   determining, based on the match, account information associated with the mobile device, wherein the account information comprises the network credential.

7. The method of claim 1, wherein causing the IoT device to communicate with the certificate authority comprises causing the IoT device to:
   establish, based on the network credential, via the second communications network, a communication session with the certificate authority;
   generate, by the IoT device, a key pair, wherein the key pair comprises a private key and a public key;
   generate, based on the private key, a certificate signing request (CSR);
   send, to the certificate authority, via the second communications network, the CSR, the public key, and a security token; and
   receive, from the certificate authority, via the second communications network, a signed identity certificate.

8. A method comprising:
   sending, by an internet-of-things (IOT) device via a first communications network comprising a gateway device, to a computing device, a first notification comprising a first device identifier associated with the IoT device;
   based on the first device identifier in the first notification and the first device identifier in a second notification received from a mobile device, receiving, from the computing device, via the first communications network, based on a determination that the first notification is associated with an account, a security token and a network credential of a second communications network associated with the account, wherein the second communications network comprises the gateway device;
   establishing, based on the network credential, via the second communications network, a communication session with a certificate authority;
   sending, via the communication session, a request for an identity certificate; and
   receiving, from the certificate authority, via the communication session, the identity certificate.

9. The method of claim 8, wherein the computing device comprises a service provider server and wherein the IoT device comprises at least one of: a camera, a thermostat, a sensor, an air purifier, a doorbell, a voice enabled device, or a remote control.

10. The method of claim 8, wherein the first communications network comprises a network configured by a service provider and wherein the second communications network comprises a network configured by a user.

11. The method of claim 8, wherein determining that the first notification is associated with the account comprises determining that the first device identifier associated with the first notification matches an identifier associated with the account, wherein the account comprises a purchaser account.

12. The method of claim 8, further comprising:
   generating, by the IoT device, a key pair, wherein the key pair comprises a private key and a public key; and
   generating, based on the private key, the request for the identity certificate.

13. The method of claim 8, wherein sending, via the communication session, the request for the identity certificate comprises sending, to the certificate authority, the request for the identity certificate, a public key, and the security token; and receiving, from the certificate authority, via the gateway device, a signed identity certificate.

14. The method of claim 8, further comprising:
receiving, from an IoT application server, a public key associated with the IoT application server;
encrypting, based on the public key associated with the IoT application server, IoT data; and
sending, via the second communications network, the encrypted IoT data to the IoT application server.

15. A method comprising:
establishing, by an internet of things (IOT) device, based on a first device identifier associated with the IoT device, a first communication session with a mobile device, wherein the first device identifier associated with the IoT device matches the first device identifier stored in the mobile device;
receiving, by the IoT device, from the mobile device via the first communication session, a security token;
accessing, by the IoT device, based on a stored network credential associated with a gateway device, a communications network associated with the gateway device;
establishing, via the communications network, a second communication session with a certificate authority;
sending, via the second communication session, a request for an identity certificate; and
receiving, from the certificate authority, via the second communication session, the identity certificate.

16. The method of claim 15, wherein the IoT device comprises at least one of: a camera, a thermostat, a sensor, an air purifier, a doorbell, a voice enabled device, or a remote control, and wherein the mobile device comprises at least one of: a smartphone, a computer, a laptop, or a tablet.

17. The method of claim 15, further comprising:
generating, by the IoT device, a key pair, wherein the key pair comprises a private key and a public key; and
generating, based on the private key, the request for the identity certificate.

18. The method of claim 15, wherein sending, via the second communication session, the request for the identity certificate comprises sending, to the certificate authority, the request for the identity certificate, a public key, and the security token; and
receiving, from the certificate authority, via the gateway device, a signed identity certificate.

19. The method of claim 15, further comprising:
receiving, from an IoT application server, a public key associated with the IoT application server;
encrypting, based on the public key associated with the IoT application server, IoT data; and
sending, via the gateway device, the encrypted IoT data to the IoT application server.

20. The method of claim 19, further comprising:
receiving, from the IoT application server, data encrypted using the public key; and
decrypting, based on a private key, the encrypted data.

* * * * *